(12) United States Patent
Supper

(10) Patent No.: US 12,188,833 B2
(45) Date of Patent: Jan. 7, 2025

(54) DETERMINING A TEMPERATURE IN AN ELECTRIC MACHINE

(71) Applicant: Schaeffler Technologies AG & Co. KG, Herzogenaurach (DE)

(72) Inventor: Sebastian Supper, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 391 days.

(21) Appl. No.: 17/782,735

(22) PCT Filed: Dec. 14, 2020

(86) PCT No.: PCT/DE2020/101054
§ 371 (c)(1),
(2) Date: Jun. 6, 2022

(87) PCT Pub. No.: WO2021/143967
PCT Pub. Date: Jul. 22, 2021

(65) Prior Publication Data
US 2023/0003587 A1    Jan. 5, 2023

(30) Foreign Application Priority Data
Jan. 14, 2020    (DE) .................... 10 2020 100 636.5

(51) Int. Cl.
*G01K 7/21*        (2006.01)
*H02K 11/25*    (2016.01)

(52) U.S. Cl.
CPC .............. *G01K 7/21* (2013.01); *H02K 11/25* (2016.01)

(58) Field of Classification Search
CPC ....... G01K 7/21; G01K 2205/00; H02K 11/25
See application file for complete search history.

(56) References Cited

U.S. PATENT DOCUMENTS 8,690,422 B2 *  4/2014  Kim ........................ G01K 7/25
374/144
2014/0219316 A1  8/2014  Tashiro et al.

FOREIGN PATENT DOCUMENTS

| DE | 1960006 A1 | 8/1970 |
|---|---|---|
| DE | 4329312 A1 | 3/1994 |
| DE | 10155459 A1 | 5/2002 |
| DE | 10155462 A1 | 6/2002 |
| DE | 102013201835 A1 | 8/2014 |
| DE | 102014205121 A1 | 10/2014 |
| DE | 102015214624 A1 | 2/2017 |
| DE | 102016200334 A1 | 7/2017 |
| DE | 102016105506 A1 | 9/2017 |
| DE | 102016215590 A1 | 2/2018 |
| DE | 102018116889 A1 | 1/2020 |
| DE | 102018119248 A1 | 2/2020 |

(Continued)

*Primary Examiner* — Mirellys Jagan

(57) ABSTRACT

A temperature in an electric machine is determined based on temperature-dependent output values of a first temperature sensor and of a second temperature sensor. The first temperature sensor has a characteristic curve having a plurality of characteristic curve branches, wherein each characteristic curve branch is associated with a specific temperature range. The output value of the second temperature sensor is used to select a characteristic curve branch; the output value of the first temperature sensor is used to determine the temperature from the selected characteristic curve branch.

20 Claims, 1 Drawing Sheet

(56) References Cited

FOREIGN PATENT DOCUMENTS

| | | | | |
|---|---|---|---|---|
| DE | 102019114235 | A1 | 12/2020 | |
| DE | 102019126136 | A1 * | 4/2021 | ............... G01K 1/20 |
| EP | 0108325 | A1 | 5/1984 | |
| EP | 3388804 | A1 | 10/2018 | |
| JP | 2017156330 | A * | 9/2017 | |
| WO | 9108441 | A1 | 6/1991 | |

* cited by examiner

DETERMINING A TEMPERATURE IN AN ELECTRIC MACHINE

CROSS-REFERENCE TO RELATED APPLICATIONS

This application is the U.S. National Phase of PCT Appln. No. PCT/DE2020/101054 filed Dec. 14, 2020, which claims priority to DE 102020100636.5 filed Jan. 14, 2020, the entire disclosures of which are incorporated by reference herein.

TECHNICAL FIELD

The disclosure relates to a method and a corresponding system for determining a temperature in an electric machine.

BACKGROUND

Determining the temperature in a technical system or of certain components of a technical system is desirable to ensure the reliable functioning of the respective technical system. This applies, for example, to the motor vehicle sector, without the disclosure being limited thereto.

German patent application DE 101 55 459 A1 relates to determining a temperature of a clutch in a motor vehicle. For this purpose, a temperature in a drive motor of the motor vehicle is used and an energy input into the clutch is calculated from torque and rotational speed. Introduction of frictional energy into a clutch and determination of the temperature of the clutch are also discussed in DE 196 02 006 A1.

According to German patent application DE 101 55 462 A1, temperature monitoring is used to detect overloading of a drive unit.

The German patent application DE 10 2013 201 835 A1 relates to the temperature detection in a stator winding of an electric machine using a temperature sensor with connecting conductors. The application discusses the routing of the connecting conductors.

The German patent application DE 10 2014 205 121 A1 discloses the determination of a temperature of a clutch of a motor vehicle from the time between the deactivation and the restarting of a control device.

The German patent application DE 10 2015 214 624 A1 discloses a method for initializing a temperature model of a clutch system of a motor vehicle. A starting temperature is determined as a function of the motor vehicle's idle time. A similar approach can be found in DE 10 2018 119 248 A1.

The German patent application DE 10 2016 215 590 A1 relates to a method for determining an actuator travel of a hydraulic clutch actuator, the actuator travel being changed as a function of a temperature of the clutch actuator.

The German patent application DE 10 2018 116 889 A1 relates to an arrangement for detecting the temperature of a stator winding of an electric machine with a temperature sensor. To ensure a reliable thermal connection between the temperature sensor and the stator winding, the temperature sensor is attached to a mounting element with two struts.

The German patent application DE 10 2019 114 235 A1 relates to a method for initializing a temperature model of a friction clutch of a hybrid drive train of a motor vehicle with an electric machine with a stator and a rotor and a friction clutch arranged radially inside said electric machine, with an initial value of the friction clutch depending on the temperature of the electric machine is determined after a restart and used as a basis for the temperature model.

In addition to the model-based approaches to determining the temperature, which are therefore limited by the quality of the respective model, there is the possibility of directly measuring the temperature, of which the prior art mentioned above also contains examples.

Thermistors, in particular NTC thermistors, are often used to measure temperature. The characteristic curve of these NTC thermistors, which indicates an output value, generally a voltage, as a function of the temperature, falls as the temperature increases, and the size of the gradient of the characteristic curve also decreases as the temperature increases. However, this means that the accuracy of the temperature determination from the output value of such an NTC thermistor decreases as the temperature increases, since the temperature change associated with a given change in the output value increases with increasing temperature. So, at higher temperatures, it becomes more difficult to resolve small temperature changes. NTC thermistors can be used in circuits which switch over at certain temperature values, so that a steeper characteristic curve is again available. In other words, such a circuit has the effect that the simple characteristic curve of an NTC thermistor is modified into a characteristic curve with a plurality of characteristic curve branches. In this case, each characteristic curve branch is assigned to a specific temperature range, and so a characteristic curve, namely the respective characteristic curve branch, with a sufficient gradient for determining the temperature, is available in each temperature range. What gradient is to be regarded as sufficient in each case depends on the respective accuracy requirements for the temperature measurement.

However, the problem with the described approach is that more than one temperature value can be associated with an output value of a temperature sensor with a circuit of the type just mentioned. This is always the case when the output value in question occurs as an output value in more than one characteristic curve branch. It is then possible to detect temperature changes with sufficient accuracy, but it is not possible to say what temperature the temperature sensor is at.

SUMMARY

It is desirable to specify a method for temperature measurement and an associated system in which the problem of ambiguity in the output values of a temperature sensor, as just explained, is avoided.

The method according to one exemplary embodiment of the disclosure relates to determining a temperature in an electric machine, for example in an electric machine of a motor vehicle. According to the method, a temperature-dependent output value of a first temperature sensor is determined. The first temperature sensor is assigned to the electric machine and has a characteristic curve with a plurality of characteristic curve branches, each characteristic curve branch being assigned to a specific temperature range. Each characteristic curve branch links a value of a temperature to an output value of the first temperature sensor. The assignment of the first temperature sensor to the electric machine means that the first temperature sensor is in thermal contact with the electric machine in order to ultimately measure a temperature of the electric machine.

A temperature-dependent output value of a second temperature sensor assigned to the electric machine is also determined. The assignment of the second temperature sensor to the electric machine means that the second temperature sensor is in thermal contact with the electric machine in order to ultimately measure a temperature of the electric machine. The output value of the second temperature sensor is used to determine a temperature range of the temperature ranges for the characteristic curve branches of the first temperature sensor, in which there is a temperature which corresponds to the output value of the second temperature sensor. The determination of this temperature range implies the selection of the characteristic curve branch corresponding to the temperature range. A temperature of the electric machine is then uniquely determined from the determined output value of the first temperature sensor and the characteristic curve branch selected in this way.

The ambiguity of an output value of the first temperature sensor that exists according to the prior art is eliminated by including the output value of the second temperature sensor and the resulting selection of a temperature range and thus a characteristic curve branch. It should be noted that for the temperature determination carried out with the second temperature sensor to select the temperature range, a lower level of accuracy is sufficient than is sought for the temperature measurement with the first temperature sensor.

The method is generally relevant to temperature measurements, but particularly for "initial" temperature measurements, such as when starting a technical system, since no information, such as from a previous temperature profile, is available to eliminate the ambiguity.

The method can be used in particular for temperature sensors in which the size of a gradient of each characteristic curve branch decreases as the temperature increases. The method can thus be used for temperature sensors based on an NTC thermistor, which include a circuit mentioned at the outset, which converts the simple characteristic curve of the NTC thermistor into a characteristic curve with a plurality of characteristic curve branches from a temperature dependency of an electrical resistance of the temperature sensor. Such a temperature sensor would be the first temperature sensor within the meaning of this application.

The system according to the disclosure comprises an electric machine, a first temperature sensor and a second temperature sensor, which are assigned to the electric machine. The first temperature sensor has a characteristic curve with a plurality of characteristic curve branches, each characteristic curve branch being assigned to a specific temperature range. Each characteristic curve branch links a value of a temperature to an output value of the first temperature sensor.

The system also comprises an evaluation unit that is configured to carry out the method described above. For this purpose, the evaluation unit has, for example, one or more processors and a memory in which instructions for the processors for carrying out the method are stored in the form of program instructions and parameters for the method. The evaluation unit can be implemented as a component of a more comprehensive control device for the electric machine, and can also use one or more processors and memories of this control device and can also be implemented entirely as software in such a control device.

BRIEF DESCRIPTION OF THE DRAWINGS

The disclosure and the advantages thereof are explained in more detail below with reference to the accompanying drawings.

The figures merely show exemplary embodiments of the disclosure and are therefore in no way to be construed as limiting the disclosure to the exemplary embodiments shown.

DETAILED DESCRIPTION

Figure 1:
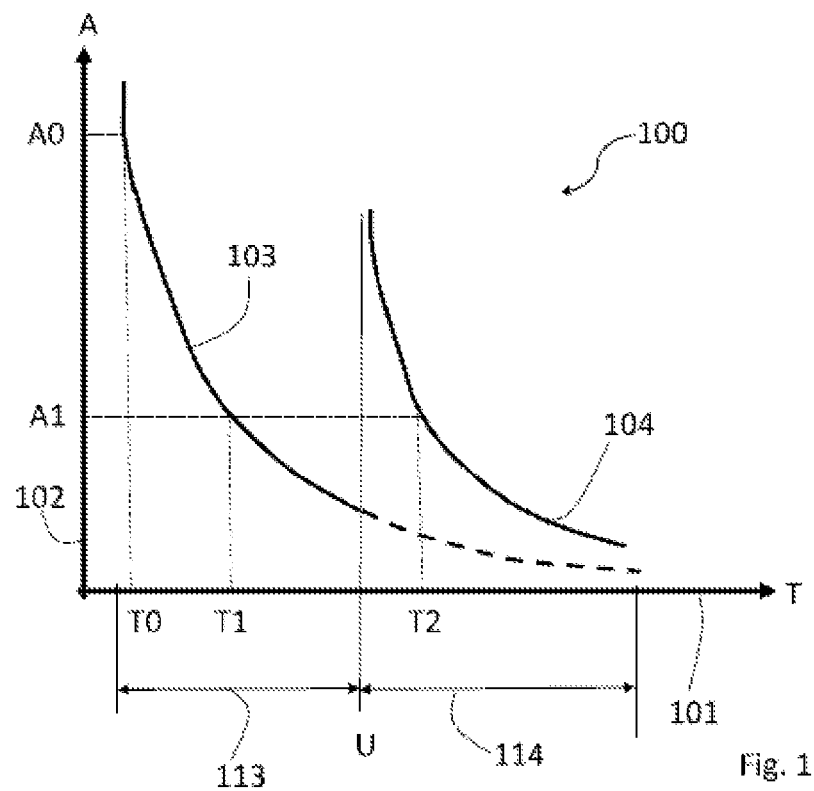
FIG. 1 shows a characteristic curve with two characteristic curve branches.

FIG. 1 shows a schematic diagram 100. Temperature T is shown on the x-axis 101 and an output value A of a first temperature sensor is shown on the y-axis 102. The diagram 100 shows a first characteristic curve branch 103 and a second characteristic curve branch 104. At a specific temperature U, a switchover is carried out between the characteristic curve branches 103 and 104; the further progression of the characteristic curve branch 103 at temperatures greater than U is shown in dashed lines; this further progression is not used in determining a temperature to be measured. Accordingly, the characteristic curve branch 103 belongs to a temperature range 113 of temperatures lower than U, and branch 104 of the characteristic curve belongs to a temperature range 114 of temperatures higher than U.

As can be seen from the diagram, a unique temperature value T0 belongs to an output value A0, since the output value A0 only occurs on the branch 103 of the characteristic curve. On the other hand, the output value A1 is associated with two temperature values, T1 and T2, since the output value A1 occurs both on the characteristic curve branch 103 and on the characteristic curve branch 104. Being unaware which of the characteristic curve branches 103 and 104 is to be used, meaning unaware of which of the temperature ranges 113 and 114 is the one currently valid, it is not possible to determine which of the temperature values T1 and T2 is the correct one for the output value A1 of the first temperature sensor. According to the method according to the disclosure, an output value from a second temperature sensor, i.e., an independent second temperature measurement, is used in order to decide between the temperature ranges 113 and 114. Once the temperature range has been determined, it is also determined which of the characteristic curve branches 103 and 104 is valid. As a result, a decision can be made between the two options T1 and T2 for the output value A1 and thus the temperature to be measured can be uniquely determined.

As one non-limiting example, the temperature ranges 113 and 114 together could cover a range from −50° C. to 250° C., while the switchover could occur at 80° C.

It should also be noted that the disclosure is not limited to the number of characteristic curve branches of the first temperature sensor being two. The disclosure also comprises embodiments with more than two characteristic curve branches, each with an associated temperature range, of the first temperature sensor. The temperature range present in each case, and thus the characteristic curve branch that is valid in each case, is determined by measuring the temperature with the second temperature sensor.

Figure 2:
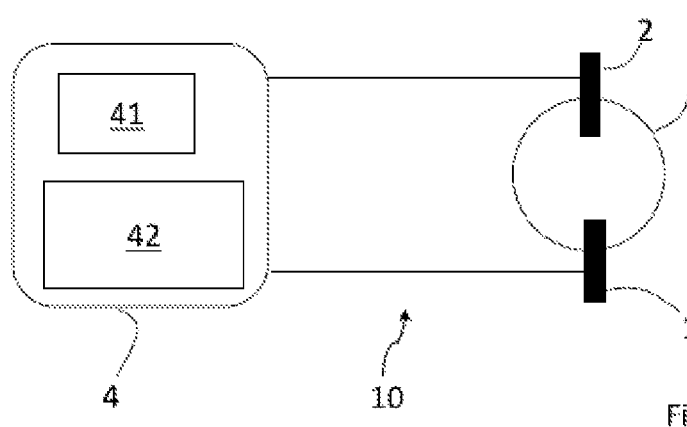
FIG. 2 shows a system according to the disclosure.

FIG. 2 shows an exemplary embodiment of a system 10 according to the disclosure with an electric machine 3, a first temperature sensor 1 and a second temperature sensor 2. The first temperature sensor 1 has a characteristic curve with a plurality of characteristic curve branches, as explained in relation to FIG. 1. The first temperature sensor 1 and second temperature sensor 2 are associated with the electric machine 3 in order to measure a temperature of the electric machine 3, more specifically, in order to generate a temperature-dependent output value in each case. The output values of the temperature sensors 1 and 2 are transmitted to an evaluation unit 4. The evaluation unit 4 has a processor 41 and a memory 42. Program instructions are stored in the memory 42 which, when executed, cause the processor 41 to carry out the method according to the disclosure described herein in at least one of its embodiments and to control the temperature sensors 1 and 2 accordingly, for example to retrieve the output values of the temperature sensors 1 and 2. In addition, the memory 42 also contains parameters for carrying out the method, such as the progression of the branches of the characteristic curve and the associated temperature ranges for the first temperature sensor 1.

LIST OF REFERENCE SIGNS

1 First temperature sensor
2 Second temperature sensor
3 Electric machine
4 Evaluation unit
10 System
41 Processor
42 Memory
100 Diagram
101 X-axis
102 Y-axis
103 Characteristic curve branch
104 Characteristic curve branch
113 Temperature range
114 Temperature range
A0, A1 Output value
T0, T1, T2 Temperature value
U Switchover temperature

The invention claimed is:

1. A method for determining a temperature in an electric machine,
the method comprising:
  determining a temperature-dependent output value of a first temperature sensor assigned to the electric machine, wherein the first temperature sensor has a characteristic curve with a plurality of characteristic curve branches, each characteristic curve branch being assigned to a respective temperature range of a plurality of temperature ranges, and each characteristic curve branch linking a value of a measured temperature to an output value of the first temperature sensor;
  determining a temperature-dependent output value of a second temperature sensor assigned to the electric machine;
  selecting one temperature range of the plurality of temperature ranges of the characteristic curve branches of the first temperature sensor, the one temperature range including the measured temperature corresponding to the output value of the second temperature sensor; and
  determining the temperature in the electric machine from the determined output value of the first temperature sensor and the characteristic curve branch assigned to the one temperature range.

2. The method according to claim 1, wherein a gradient in each characteristic curve branch decreases as the temperature increases.

3. The method according to claim 1, further comprising generating the plurality of characteristic curve branches from a temperature dependency of an electrical resistance of the first temperature sensor, wherein the first temperature sensor includes an NTC thermistor.

4. The method according to claim 1, wherein the plurality of temperature ranges includes a first temperature range extending from a minimum temperature to a threshold temperature, and wherein the plurality of temperature ranges includes a second temperature range extending from the threshold temperature to a maximum temperature.

5. The method according to claim 4, further comprising selecting the first temperature range based on the measured temperature corresponding to the output value of the second temperature sensor being less than the threshold temperature.

6. The method according to claim 4, further comprising selecting the second temperature range based on the measured temperature corresponding to the output value of the second temperature sensor being greater than the threshold temperature.

7. The method according to claim 4, wherein each characteristic curve branch links the value of the measured temperature to the output value of the first temperature sensor when the measured temperature is greater than the threshold temperature.

8. The method according to claim 4, wherein at least one of the characteristic curve branches fails to link the value of the measured temperature to the output value of the first temperature sensor when the measured temperature is less than the threshold temperature.

9. A system comprising
an electric machine;
a first temperature sensor assigned to the electric machine;
a second temperature sensor assigned to the electric machine; and
an evaluation unit configured to:
  store a characteristic curve, associated with the first temperature sensor, the characteristic curve having a plurality of characteristic curve branches, each characteristic curve branch being assigned to a respective temperature range of a plurality of temperature ranges, and each characteristic curve branch linking a value of a measured temperature to an output value of the first temperature sensor,
  determine a temperature-dependent output value of the second temperature sensor,
  select one temperature range of the plurality of temperature ranges of the characteristic curve branches of the first temperature sensor, the one temperature range including the measured temperature corresponding to the output value of the second temperature sensor; and
  determine a temperature in the electric machine from the determined output value of the first temperature sensor and the characteristic curve branch assigned to the one temperature range.

10. The system according to claim 9, wherein a gradient in each characteristic curve branch decreases as the temperature increases.

11. The system according to claim 9, wherein the plurality of temperature ranges includes a first temperature range extending from a minimum temperature to a threshold temperature, and wherein the plurality of temperature ranges includes a second temperature range extending from the threshold temperature to a maximum temperature.

12. The system according to claim 11, wherein the evaluation unit is further configured to select the first temperature range based on the measured temperature corresponding to the output value of the second temperature sensor being less than the threshold temperature.

13. The system according to claim 11, wherein the evaluation unit is further configured to select the second temperature range based on the measured temperature corresponding to the output value of the second temperature sensor being greater than the threshold temperature.

14. The system according to claim 11, wherein each characteristic curve branch links the value of the measured temperature to the output value of the first temperature sensor when the measured temperature corresponding to the output value of the second temperature sensor is greater than the threshold temperature.

15. The system according to claim 11, wherein at least one of the characteristic curve branches fails to link the value of the measured temperature to the output value of the first temperature sensor when the measured temperature corresponding to the output value of the second temperature sensor is less than the threshold temperature.

16. A system comprising an evaluation unit including a processor and a memory, the memory storing instructions executable by the processor to:
   determine a temperature-dependent output value of a first temperature sensor;
   determine a temperature-dependent output value of a second temperature sensor;
   select one of a plurality of characteristic curve branches based on a measured temperature corresponding to the output value of the second temperature sensor, wherein each characteristic curve branch is associated with a respective temperature range and links a value of the measured temperature to the output value of the first temperature sensor; and
   determine a temperature from the determined output value of the first temperature sensor and the one characteristic curve branch.

17. The system of claim 16, wherein the first temperature sensor and the second temperature sensor are in thermal contact with an electric machine.

18. The system according to claim 16, wherein each of the plurality of characteristic curve branches is associated with a respective temperature range, and wherein the instructions further include instructions to select the one characteristic curve branch based on the measured temperature corresponding to the output value of the second temperature sensor being within the temperature range associated with the one characteristic curve branch.

19. The system according to claim 16, wherein each characteristic curve branch links the value of the measured temperature to the output value of the first temperature sensor when the measured temperature corresponding to the output value of the second temperature sensor is greater than a threshold temperature.

20. The system according to claim 16, wherein at least one of the characteristic curve branches fails to link the value of the measured temperature to the output value of the first temperature sensor when the measured temperature corresponding to the output value of the second temperature sensor is less than a threshold temperature.

\* \* \* \* \*